US009606213B2

(12) United States Patent
Meiman

(10) Patent No.: US 9,606,213 B2
(45) Date of Patent: Mar. 28, 2017

(54) SYSTEM AND METHOD FOR DIRECTIONALLY CLASSIFYING RADIO SIGNALS

(71) Applicant: ELBIT SYSTEMS BMD AND LAND EW—ELISRA LTD, Holon (IL)

(72) Inventor: Yehuda Meiman, Rishon le' Zion (IL)

(73) Assignee: Elbit Systems BMD and Land EW—Elisra LTD, Holon (IL)

( * ) Notice: Subject to any disclaimer, the term of this patent is extended or adjusted under 35 U.S.C. 154(b) by 0 days.

(21) Appl. No.: 14/910,722

(22) PCT Filed: Aug. 6, 2014

(86) PCT No.: PCT/IL2014/050712
§ 371 (c)(1),
(2) Date: Feb. 8, 2016

(87) PCT Pub. No.: WO2015/019354
PCT Pub. Date: Feb. 12, 2015

(65) Prior Publication Data
US 2016/0187451 A1    Jun. 30, 2016

(30) Foreign Application Priority Data

Aug. 8, 2013  (IL) .......................................... 227858

(51) Int. Cl.
*G01S 3/46*   (2006.01)
*G01S 3/04*   (2006.01)
*G01S 3/48*   (2006.01)

(52) U.S. Cl.
CPC ................ *G01S 3/46* (2013.01); *G01S 3/043* (2013.01); *G01S 3/48* (2013.01)

(58) Field of Classification Search
CPC ..... G01S 3/46; G01S 3/48; G01S 3/02; G01S 3/043
See application file for complete search history.

(56) References Cited

U.S. PATENT DOCUMENTS 2,860,336 A    11/1958   Earp et al.
3,659,085 A     4/1972   Potter et al.
(Continued)

FOREIGN PATENT DOCUMENTS

EP      0148672 A1    7/1985
WO      0041402 A2    7/2000
WO   2011162808 A1   12/2011

OTHER PUBLICATIONS

Office Action and Search Report Apr. 28, 2014 for Israeli Application No. 227858 (8 Pages).
(Continued)

*Primary Examiner* — Cassie Galt
(74) *Attorney, Agent, or Firm* — Brown Rudnick LLP

(57) ABSTRACT

A system for directionally classifying of a radio signal originating from an emitter. The system includes a receiving-station, which includes at least two antennas, a single-channel-receiver producing a first and a second received signals and a switch alternately coupling each of the antennas with the single-channel-receiver. The system further includes another receiving-station which includes another receiver, producing another received signal, coupled with a first other antenna. The system further includes directional-classifier which includes a phase-difference-detector, coupled with the single-channel-receiver and with said another receiver. The phase-difference-detector produces a first phase difference measurement when the switch couples one antenna with the single-channel-receiver. The phase-difference-detector further produces a second phase-difference-measurement when the switch couples the other antenna with the single-channel-receiver. The directional classifier subtracts the second phase-difference-measurement from the first-phase-difference measurement producing a phase-difference-estimate. The receiving station and (Continued)

the other receiving station are in relative motion one with respect to the other.

12 Claims, 11 Drawing Sheets

(56) References Cited

U.S. PATENT DOCUMENTS

| | | | |
|---|---|---|---|
| 3,691,560 | A | 9/1972 | Hammack |
| 3,789,411 | A | 1/1974 | Bataille et al. |
| 3,795,911 | A | 3/1974 | Hammack |
| 3,866,229 | A | 2/1975 | Hammack |
| 3,987,446 | A | 10/1976 | Lipsky et al. |
| 4,150,375 | A | 4/1979 | Ross et al. |
| 4,151,525 | A | 4/1979 | Strauch et al. |
| 4,328,499 | A | 5/1982 | Anderson et al. |
| 4,754,281 | A | 6/1988 | Donath |
| 5,010,343 | A | 4/1991 | Andersson |
| 5,334,984 | A | 8/1994 | Akaba |
| 5,457,466 | A | 10/1995 | Rose |
| 5,457,708 | A | 10/1995 | Baghdady |
| 5,515,061 | A | 5/1996 | Hiltz et al. |
| 5,657,026 | A | 8/1997 | Culpepper et al. |
| 5,786,791 | A | 7/1998 | Bruckert |
| 5,892,700 | A | 4/1999 | Haardt |
| 5,990,834 | A | 11/1999 | Barrick et al. |
| 6,115,599 | A | 9/2000 | Stilp |
| 6,255,991 | B1 | 7/2001 | Hedin |
| 6,271,791 | B1 | 8/2001 | Bruzzone |
| 6,529,158 | B2 | 3/2003 | Martin-Neira et al. |
| 6,646,601 | B2 | 11/2003 | Samson et al. |
| 7,567,627 | B1 * | 7/2009 | Fraundorfer .......... G01S 5/0221 375/316 |
| 7,612,715 | B2 | 11/2009 | Macleod |
| 7,692,575 | B2 | 4/2010 | Nishimura |
| 8,188,923 | B2 | 5/2012 | Ferreol et al. |
| 8,305,265 | B2 | 11/2012 | Ezal et al. |
| 2003/0080887 | A1 | 5/2003 | Havelock |
| 2006/0158375 | A1 | 7/2006 | Macleod |
| 2011/0074633 | A1 | 3/2011 | Pun et al. |
| 2011/0148578 | A1 | 6/2011 | Aloi et al. |
| 2011/0241942 | A1 | 10/2011 | Hill |
| 2011/0304507 | A1 | 12/2011 | Mujahed et al. |

OTHER PUBLICATIONS

Notice Before Allowance, Mailed Apr. 22, 2015 for Israeli Application No. 227858 (4 Pages).
Notice of Allowance Mailed Jun. 25, 2015 for Israeli Application No. 227858 (1 Page).
As-Allowed Israeli Application No. 227858 (54 Pages).
"Signal Sorting Methods and Direction Finding", University of Hawaii, Oct. 2010 (9 Pages).
Harter, Nathan M., "Development of a Single-Channel Direction Finding Algorithm", Virginia Polytechnic 2007 (117 Pages).
Keavey, John Joseph, "Analysis and Implementation of a Novel Single Channel Direction Finding Algorithm on a Software Radio Platform", Virginia Polytechnic 2005 (82 Pages.
Porter et al., "A sixteen-channel multiplexing upgrade for single channel receivers" Magnetic Resonance Imaging 19 (2001) 1009-1016 (8 Pages).
R&S®DDF255 Digital Direction Finder, Rohde & Schwarz (20 Pages).
Read, W, "Review of Conventional Tactical Radio Direction Finding Systems", Communications Electronic Warfare Section Electronic Warfare Division Defence Research Establishment Ottawa, Technical Note 89-12 (64 Pages).
International Preliminary Report on Patentability Mailed Feb. 9, 2016 for International Application No. PCT/IL2014/050712 (6 Pages).
International Search Report and Written Opinion Mailed Feb. 2, 2015 for International Application PCT/IL2014/050712 (8 Pages).

* cited by examiner

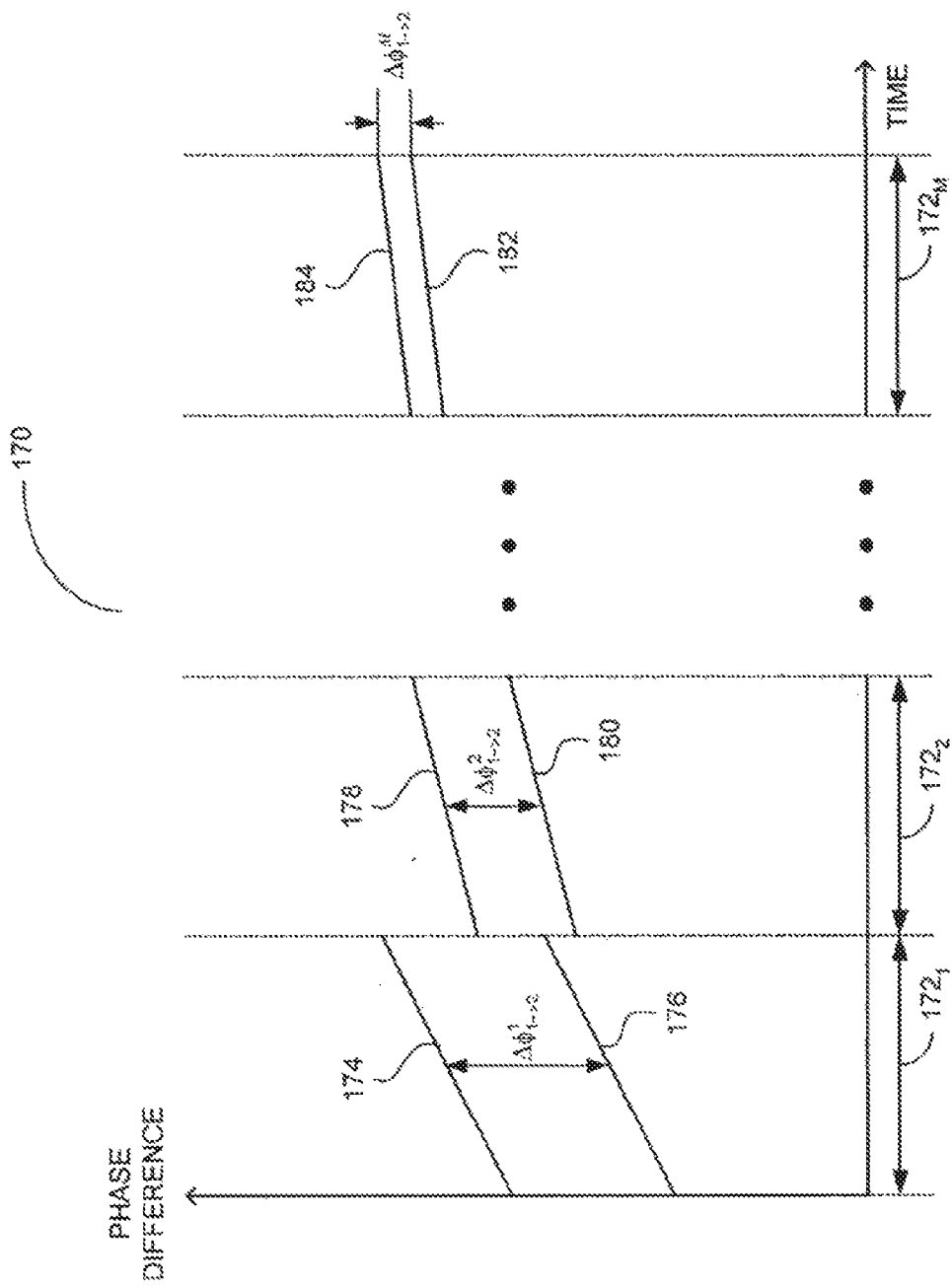

SYSTEM AND METHOD FOR DIRECTIONALLY CLASSIFYING RADIO SIGNALS

FIELD OF THE DISCLOSED TECHNIQUE

The disclosed technique relates to determining the direction of arrival of a radio signal in general and to methods and systems for directionally classifying of radio signals according to the direction of arrivals thereof in particular.

BACKGROUND OF THE DISCLOSED TECHNIQUE

In some application, such as in Electronic Intelligence (Elint), aircraft traffic management, radio navigation and distress transmitter location, a radio receiver (e.g., located at the control tower in aircraft traffic management systems) may receive a plurality of different radio signals originating from different radio emitters (e.g., the airplanes). To facilitate efficient processing of these received radio signals, it may be required to classify or sort the received signals according to certain parameters. These parameters are, for example, frequency, Pulse Repetition Interval (PRI), Pulse Width (PW), Time Of Arrival (TOA), Direction Of Arrival (DOA) and power.

Prior to classifying the received radio signals according to the DOA, the DOA of the radio signals should be determined. Systems for determining the DOA a radio signal emitted by a radio emitter are known in the art. A radio emitter is referred to herein as a device, which generates (i.e., a source) or reflects electromagnetic radiation at a frequency range extending substantially within the radio frequency band (e.g., between 30 kilo Hertz and 300 Giga Hertz). Electromagnetic radiation emitted by a radio emitter is also referred to herein as a radio signal. A known in the art technique used to determine the DOA of a radio signal is to determine the phase difference of a radio signal received by at least two antennas. In the two-dimensional (2D) case, a radio DOA determining system employs at least two antennas and measures the difference in the phase of the radio signal received by one antenna, relative to the radio signal received by the other antenna. The difference in phase between the radio signal received by the two antennas, relates to the DOA of the radio signal (i.e., the direction at which the radio emitter is located) as follows:

$$\Delta\phi = (2\pi d/\lambda)\sin\theta \quad (1)$$

where $\Delta\phi$ represents the difference in phase between the radio signal received by the two antennas, ad represents the relative distance between the two antennas, $\lambda$ represents the wavelength of the radio signal and $\theta$ represents the DOA of the radio signal. Equation (1) has a single solution as long as the relative distance d, between the two antennas is smaller or equal to half the wavelength of the radio signal (i.e., $d \leq \lambda/2$).

In general, receiving radio signals via two antennas requires two receiving channels (i.e., either two separate synchronized receivers or a dual channel receiver). However, the two antennas may alternately be coupled with a single channel receiver via a switch.

U.S. Pat. No. 5,457,466 to Rose, directs to a method for employing linear arrays for measuring the angle of arrival of a signal to determine the direction (i.e. azimuth and elevation) of an emitter from an aircraft. The linear arrays may be mounted on a single or multiple aircrafts. When two or more platforms are used, monopulse phase measurements from each platform are employed to determine the azimuth and elevation of the emitter. The measurements from the multiple platforms require no time-simultaneity but rather the locations and attitudes of the platforms. However, the origin of the phase measurements, (i.e. whether single platform or multiplatform), is immaterial to the described method. According to the method directed to by Rose, a virtual spatial array is generated from the linear arrays based on aircraft six-degree-of-freedom (6DOF) motion. The baselines at different times are assumed to generate AOA cones all having a common origin, the intersection of these cones gives the emitter DOA.

U.S. Pat. No. 5,334,984 to Akaba directs to a direction finding system and method for locating the direction of a source from a receiver. According to one embodiment directed to by Akaba the receiving station is equipped with a change-over switch disposed between direction-finding receiver antennas. As the direction-finding receiver antennas are switched by the switch and the amplitude of each antenna is measured. A signal representing the direction information is determined by averaging the received signals from each antenna. According to one embodiment directed to by Akaba, an average of a signal S, representing direction information, is determined. In another embodiment, averaging is performed for each and every received signal $E_a$ and $E_b$, from which the signal S is determined.

U.S. Pat. No. 6,255,911 to Hedin directs to an interferometer antenna system for measuring the angle of arrival of RF signals. The system directed to by Hedin includes a plurality of antennas connected to switching network. The switching network is connected to only two interferometer receivers. The switching network selectively connects the plurality of antenna elements in pairs to the two receivers in a sequential manner. Thus, the phase difference is measured between the received signal for several of the pairs of the antennas. Additionally, a plurality of guard antennas are coupled to a second switching network. A single guard receiver is coupled to the second switching network. The second switching network selectively connects one of the guard antenna elements to the guard receiver in a sequential manner. A controller employs a suitable angle of arrival algorithm to generate a best estimate of the direction of the received signal based on the phase signals from the two receivers and the power signal from the guard receiver.

U.S. Pat. No. 2,860,336 to Earp et al, entitled "Radio Direction Finding System" directs to a short wave direction-finding station, which includes an array of nine antennas uniformly spaced around a circumference of a circle and a reference antenna located sufficiently far from the array to ensure that negligible interference shall occur between the antennas. The antennas in the array are commutatively coupled with one channel of a two-channel radio receiver. The reference antenna is coupled with a second channel of the two-channel radio receiver. The signal from the two radio channels are mixed together to produce a signal exhibiting a phase which varies in accordance with the instantaneous difference between the phase of the signal received by the commutated antenna in the array and the signal received by the reference antenna. A phase discriminator determines the phase difference between the signal received by the currently active antenna and the signal received by the antenna, which was active one commutation step earlier

SUMMARY OF THE PRESENT DISCLOSED TECHNIQUE

It is an object of the disclosed technique to provide a novel method and system for directionally classifying radio signals. In accordance with the disclosed technique, there is thus provided a system for directionally classifying of a radio signal originating from an emitter. The system includes a receiving station, at least one other receiving station including and a directional classifier. The receiving station includes a switch, an antenna, at least a second antenna and a single channel receiver. The switch includes at least two input ports and at least one output port and alternately couples each of the at least two input ports with the output port. The antenna is coupled with a respective one of the at least two input ports and receives at least a radio signal originating from the emitter and produces a first electric received signal. The at least second antenna is coupled with a respective another one of the at least two input ports and receives at least the radio signal originating from the emitter and produces a second electric received signal. The single channel receiver is coupled with the output port of the switch, performs reception operations on the first electric received signal and on the second electric received signal and produces a first and a second received signals respectively.

The at least one other receiving station includes, at least a first other antenna and another receiver. The at least first other antenna receives respective radio signal originating from the emitter and produces another electric received signal. The another receiver is coupled with the at least first other antenna, performs reception operations on the another electric signal produced by the first other antenna and produces another received signal. The directional classifier includes a phase difference detector and is coupled with the single channel receiver and with the other receiver. The phase difference detector measures a first phase difference between the first received signal and the another received signal when the switch couples the antenna with the single channel receiver and produces a first phase difference measurement. The phase difference detector further measures a second phase difference between the second received signal and the another received signal when the switch couples the second antenna with the single channel receiver and produces a second phase difference measurement. The directional classifier subtracts the second phase difference measurement from the first phase difference measurement and produces a phase difference estimate. The receiving station and the at least one other receiving station are in relative motion one with respect to the other.

In accordance with another aspect of the disclosed technique, there is thus provided a method for directionally classifying of a radio signal originating from an emitter. The method includes the procedures of coupling a first antenna with a single channel receiver, measuring a first phase difference between the received signal from the first antenna and the received signal from a reference antenna and producing a first phase difference measurement. The method further includes the procedures of coupling a second antenna with the single channel receiver and measuring a second phase difference between the received signal from the second antenna and the received signal from the reference antenna and producing a second phase difference measurement. The method also includes the procedures of subtracting the second phase difference measurement from the first phase difference measurement to produce a phase difference estimate between the received signal from the first antenna and the received signal from the second antenna and directionally classifying the emitter according to the phase difference estimate.

BRIEF DESCRIPTION OF THE DRAWINGS

The disclosed technique will be understood and appreciated more fully from the following detailed description taken in conjunction with the drawings in which:

FIGS. 2A and 2B are schematic illustrations of a time versus phase difference graphs, in accordance with another embodiment of the disclosed technique;

DETAILED DESCRIPTION OF THE EMBODIMENTS

The disclosed technique overcomes the disadvantages of the prior art by providing a system and a method for directionally classifying of radio signals at a receiving station. The DOA of the radio signal is typically determined with a given resolution (i.e., a range of possible directions either determined by the user or determined by hardware limitations). Thus, in an environment saturated with radio emitters (e.g., tens or hundreds of emitters) the radio signals associated with several of these radio emitters may be determined as exhibiting the same DOA. Accordingly, when a certain range of directions is of interest, only radio emitters associated with radio signals arriving from that range of directions are classified for further processing. In general, as mentioned above, the DOA of a radio signal may be estimated according to the difference in phase difference of a radio signal received by at least two antennas.

According to the disclosed technique, a first receiving station includes two antennas, coupled with a single channel receiver via a switch. The switch alternately couples the two antennas with the single channel receiver. When the switch couples the first antenna with the receiver, a directional classifier measures the phase difference between the signal received from this first antenna and the signal received from a reference antenna. The reference antennal is located on a second receiving station different from the first receiving station. The two receiving stations may be asynchronous one with respect to the other, in relative motion one with respect to the other or both. Thus, the phase difference measurement may include errors caused by various error factors. These error factors are, for example, the drift between the clocks of the two different receivers or the modulation of the received signal. The error factors may further be the phase ambiguity when the distance between the first antenna and the reference antenna is larger than half the wavelength of the radio signal or due to relative motion between the two receiving stations, which may introduce Doppler shifts. When the switch couples the second antenna with the receiver, the directional classifier measures the phase difference between the signal received from this second antenna and the signal received from the reference antenna. This phase difference measurement may also include error factors as described above. Subtracting these two phase difference measurements, results in the phase difference between the signal received from the first antenna and the signal received from the second antenna, with the error factors alleviated.

Figure 1A:
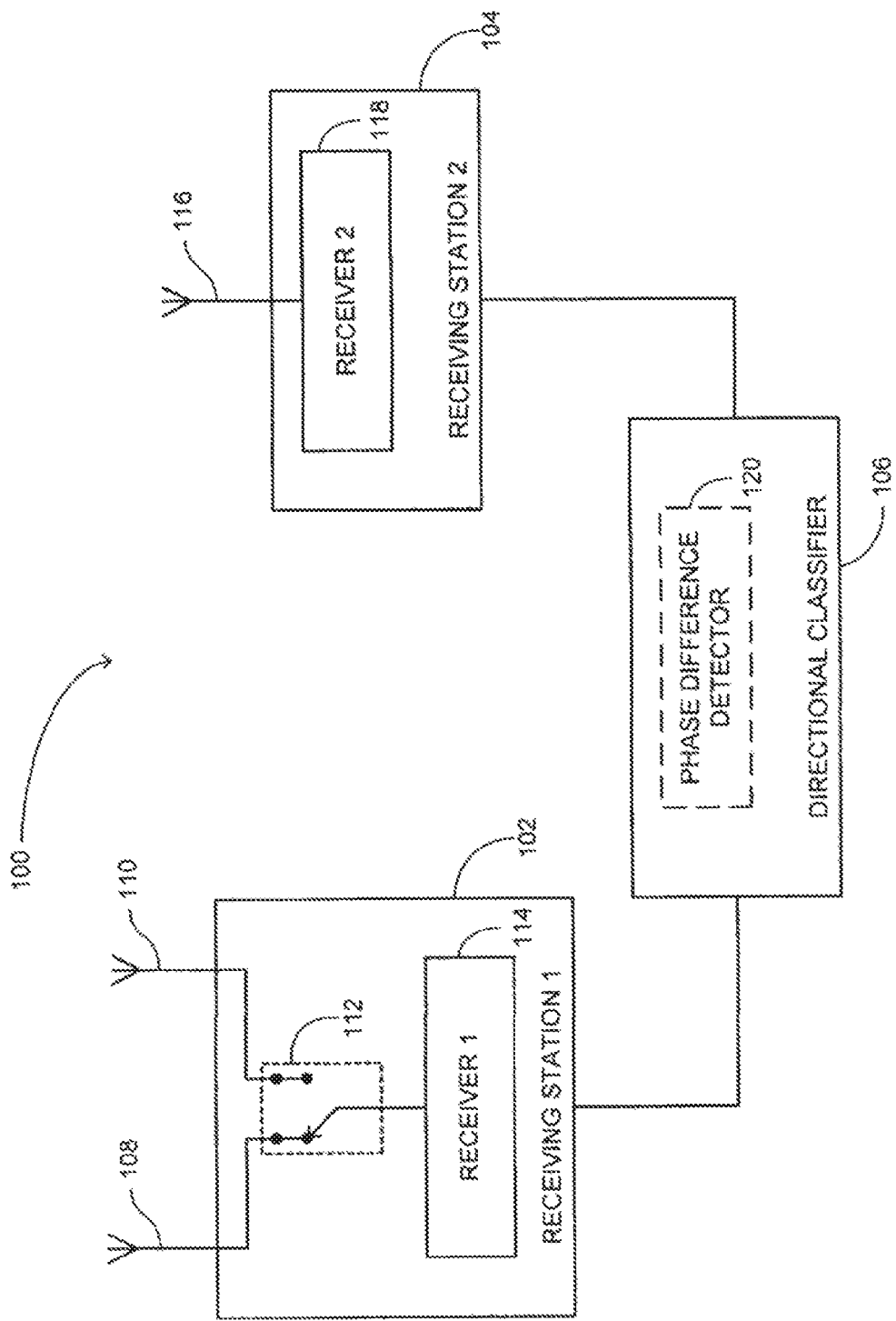
FIGS. 1A and 1B are schematic illustrations of a system for directionally classifying received radio signals, constructed and operative in accordance with an embodiment of the disclosed technique.
Figure 1B:
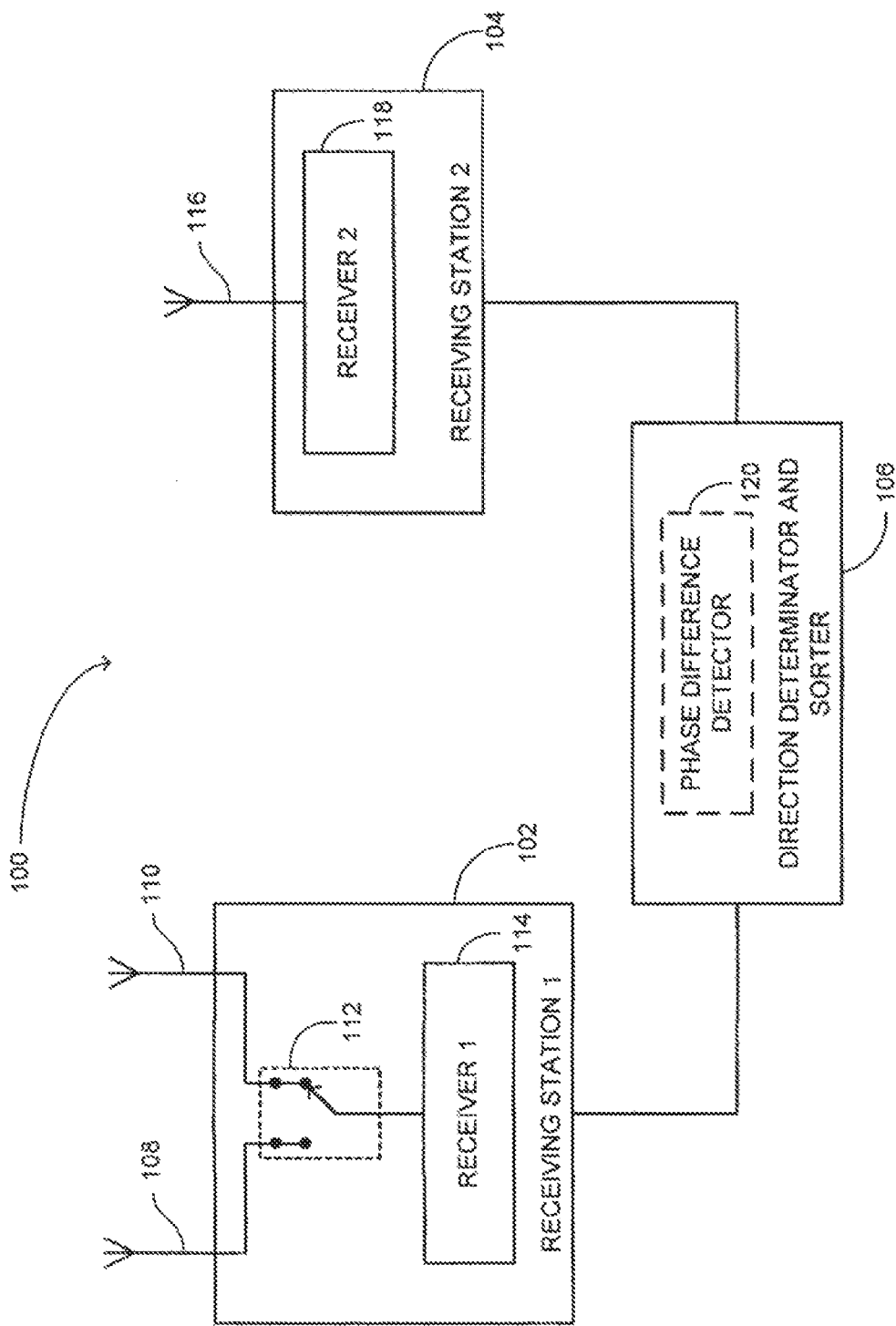

Reference is now made to FIGS. 1A and 1B, which are schematic illustrations of a system for directionally classifying received radio signals, generally referenced 100, constructed and operative in accordance with an embodiment of the disclosed technique. System 100 includes a first receiving station 102 a second receiving station 104 and a directional classifier 106. First receiving station 102 includes a first antenna 108, a second antenna 110, a switch 112 and a first receiver 114. Second receiving station 104 includes a reference antenna 116 and a second receiver 118. Directional classifier 106 includes a phase difference detector 120. Switch 112 includes at least two input ports and at least one output port. Switch 112 alternately couples each input port with the output port according to a switching scheme. Switch 112 is coupled with first antenna 108 via one input port, with second antenna 110 via the other input port and with first receiver 114 via the output port. Reference antenna 116 is coupled with second receiver 118. Directional classifier 106 is coupled with first receiver 114 and with second receiver 118. Directional classifier 106 may be located at either one of a first receiving station 102 and second receiving station 104 or at another station (i.e., a dedicated control station or another receiving station—both not shown). Thus, directional classifier 106 may be wired or wirelessly coupled with first receiver 114 and with second receiver 118. Furthermore, first receiving station 102 and second receiving station 104 may be asynchronous one with respect to the other (i.e., first receiver 114 and second receiver 118, each employ a different clock) and may further be in relative motion one with respect to the other.

With reference to FIG. 1A, switch 112 is depicted in a first state thereof, which couples first antenna 108 with first receiver 114 for at least a measurement time-period. In general the term 'state' herein with regards to a switch refers to the coupling of one of the inputs of the switch with the output of the switch or coupling the output with a null (i.e., the output is not coupled with either one of the inputs) when such exists. Each one of first antenna 108 and reference antenna 116 receives a respective radio signal originating from the same radio emitter, transforms the received radio signals and produces a respective electric received signal. First antenna 108 provides the electric received signal produced thereby to first receiver 114. Reference antenna 116 provides the electric received signal produced thereby to second receiver 118. Each one of first receiver 114 and second receiver 118 performs reception operations on each of the respective electric received signals (i.e., the electric received signal by first antenna 108 and the electric received signal by reference antenna 116) to produce a respective received signals. These reception operations include, for example, down conversion, filtering, sampling, demodulation, equalization and the like. Each one of first receiver 114 and second receiver 118 may be embodied as a superheterodyne receiver or a software radio receiver. Each one of first receiver 114 and second receiver 118 provides the respective received signal thereof to phase difference detector 120. At least one of first receiver 114 and second receiver 118 further determines the frequency of the received signal (e.g., the carrier frequency in case the radio signal is a modulated signal, or the lowest frequency component of the received signal) and provides this frequency to directional classifier 106.

Phase difference detector 120 measures the phase difference between the received signal from first antenna 108 and the received signal from reference antenna 116 during the measurement time-period and produces a first phase difference measurement. This first phase difference measurement may include at least one of the above mentioned errors as follows:

$$M_1(t) = \Delta\phi_{1 \to R}(t) + \epsilon \qquad (1)$$

where $M_1(t)$ represents the first phase difference measurement between first antenna 108 and reference antenna 116 during the measurement time-period (i.e., as a function of time), $\Delta\phi_{1 \to R}(t)$ represents the error free phase difference between first antenna 108 and reference antenna 116 during the measurement time-period and $\epsilon$ represents the error introduced to the phase difference measurement by the various error factors described above.

With reference to FIG. 1B, switch 112 is depicted in a second state thereof, which couples second antenna 110 with first receiver 114 for at least a measurement time-period. Each one of second antenna 110 and reference antenna 116 receives a respective radio signal originating from the radio emitter (i.e., the same radio emitter referred to in FIG. 1A) and produce a respective electric received signal. First antenna 116 provides the signal received thereby to first receiver 114. Reference antenna 116 provides the signal received thereby to second receiver 118. Each one of first receiver 114 and second receiver 118 performs reception operations on each of the respective received signals to produce a respective received signal and provides the respective received signal thereof to phase difference detector 120.

Phase difference detector 120 measures the phase difference between the received signal from second antenna 110 and the received signal from reference antenna 116 during the measurement time-period and produces a second phase difference measurement. This second phase difference measurement may also include errors as follows:

$$M_2(t) = \Delta\phi_{2 \to R}(t) + \epsilon \qquad (2)$$

where $M_2(t)$ represents the second phase difference measurement between first antenna 108 and reference antenna 116 during the measurement time-period, $\Delta\phi_{2 \to R}(t)$ represents the error free phase difference between second antenna 110 and reference antenna 116 during the measurement time-period and $\epsilon$ represents the various error factors.

It is noted that the measurement interval is substantially smaller than, one cycle the Doppler frequency shift and the drift between the clocks. However, in general the measurement interval may be as long as required, so long that during the measurement interval, the Doppler frequency shift and the clock drift are substantially stable. Therefore, the effect of the error factors on both measurements is substantially the same. Thus, directional classifier 106 subtracts $M_2$ from $M_1$, which results in a phase difference estimate between the received signal from first antenna 108 and received signal from second antenna 110 with the error due to the various error factors, alleviated as follows:

$$\Delta\phi_{1 \to 2} = M_1 - M_2 \qquad (3)$$

where $\Delta\phi_{1\to 2}$ represents the phase difference between the signal received by first antenna 108 and the signal received by second antenna 110.

Once directional classifier 106 determines the phase difference $\Delta\phi_{1\to 2}$, directional classifier 106 estimates the direction from which the radio signal was received according to:

$$\theta = \arcsin\left(\frac{\lambda(\Delta\phi_{1\to 2} - 2\pi N)}{2\pi d}\right) \quad (4)$$

where $\theta$ represents the DOA of the radio signal, $\lambda$ is the wavelength of the radio signal, and d is the distance between first antenna 108 and second antenna 110 and N represents the number of times the wavelength $\lambda$ repeats in the distance d between the antennas (i.e., N is an integer and N=0 when $d<\lambda/2$).

Figure 2A:
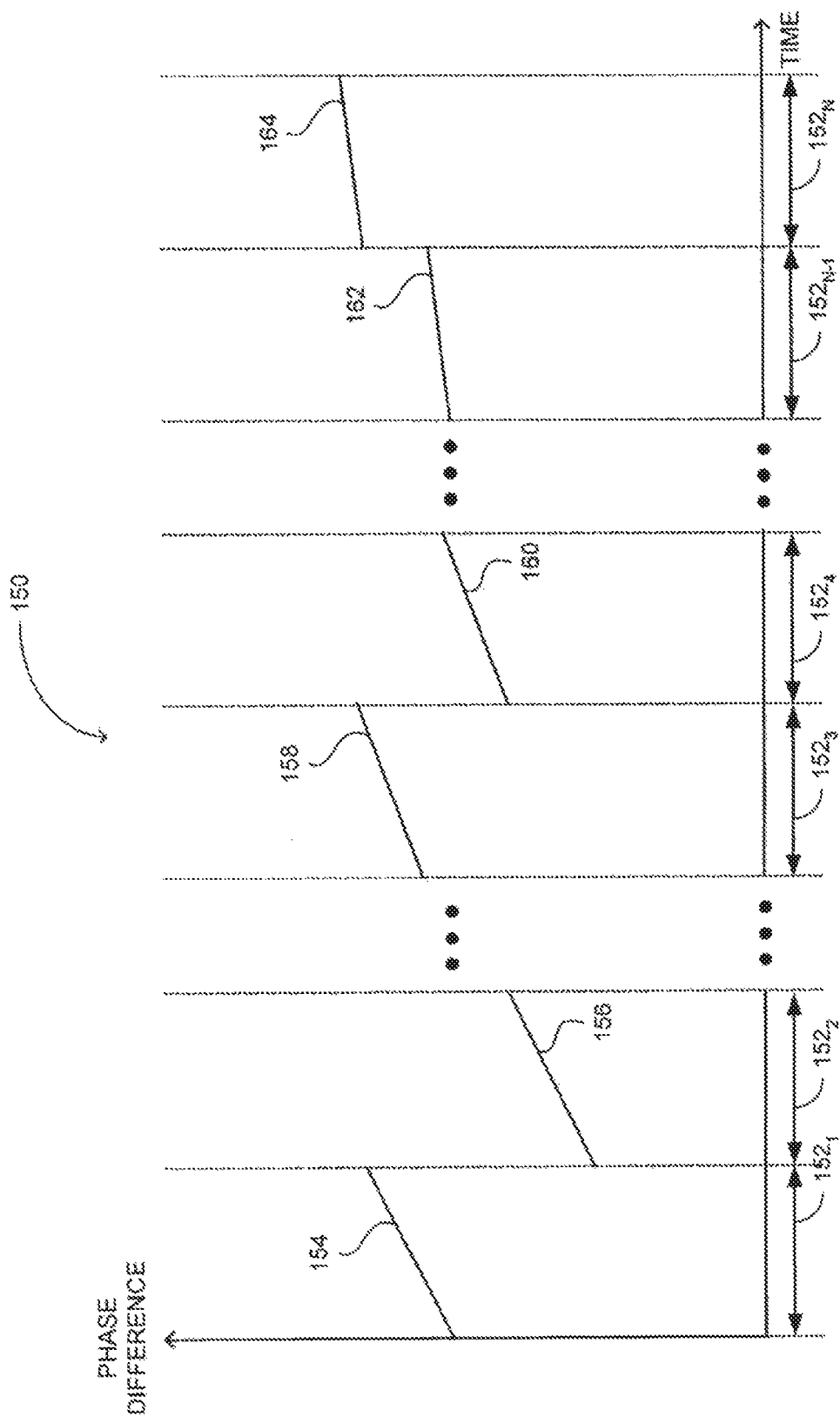

Reference is now made to FIGS. 2A and 2B, which are a schematic illustration of a time versus phase difference graphs, generally referenced 150 and 170 respectively, in accordance with another embodiment of the disclosed technique and still referring to FIGS. 1A and 1B). With reference to FIG. 2A, in graph 150 the time axis is divided into a plurality of measurement time-periods $152_1$, $152_2$, ..., $152_N$. Phase difference measurements, between the received signal from the first antenna on the first receiving station (e.g., antenna 108 in first receiving station 102 both in FIGS. 1A and 1B) and the received signal from reference antenna (e.g., antenna 116 in second receiving station 104 both in FIGS. 1A and 1B) are represented by curves 154, 158 and 162 during measurement time-periods $152_1$, $152_3$, ..., $152_{N-1}$ respectively. Phase difference measurements, between the received signal from second antenna on the first receiving station (e.g., antenna 110 in first receiving station 102 both in FIGS. 1A and 1B) and the received signal from the reference antenna (e.g., antenna 116 in second receiving station 104 both in FIGS. 1A and 1B) are represented, for example, by curves 156, 160 and 164, during measurement time-periods $152_2$, $152_4$, ..., $152_N$ respectively. Each one of curves 154, 156, 158, 160, 162 and 164 exhibits a slope. This slope is caused by the various error factors introduced to the phase difference measurement. As mentioned above, these error factors are caused by the drift between the clocks of the two different receivers, by the modulation of the received signal, by phase measurement ambiguity (i.e., caused when the distance between the first antenna and the reference antenna is larger than half the wavelength of the radio signal) or due to relative motion between the two receiving stations (i.e., which may introduce Doppler shifts).

With reference to FIG. 2B, in graph 170 the time axis is also divided into a plurality of time intervals $172_1$, $172_2$, ..., $172_M$. In graph 170, the phase different measurements of two subsequent measurements $152_1$, $152_2$, ..., $152_N$ (FIG. 2A), each relating to a different state of switch 112 (FIGS. 1A and 1B), are superimposed on the same time interval. In graphs 150 and 170, no phase difference measurement is superimposed twice. In other words, phase difference measurements 154 and 156 are superimposed on time interval $172_1$ and represented by curves 174 and 176. Phase difference measurements 158 and 160 are superimposed on time interval $172_2$ and represented by curves 178 and 180. Phase difference measurements 164 and the phase difference measurement 162 are superimposed on time interval $172_M$ and are represented as curves 182 and 184. The difference between curve 174 and curve 176 (i.e., or the numerical representation thereof) results in the phase difference between the received signal from first antenna 108 (FIGS. 1A and 1B) and the received signal from second antenna 110 (FIGS. 1A and 1B) with the error factors alleviated. In other words, there is no need to synchronize receiver 114 with receiver 118, there is no need to demodulate the received signal and there is no need to estimate the relative motion or relative distance between receiving station 102 and receiving station 104. Theoretically, a single measurement may be used to determine the phase difference between signals received from the two antennas. However, measuring the phase difference over time allows for reducing errors caused for example by noise or clock and frequency jitter (e.g., by averaging the measurements over time).

Figure 3A:
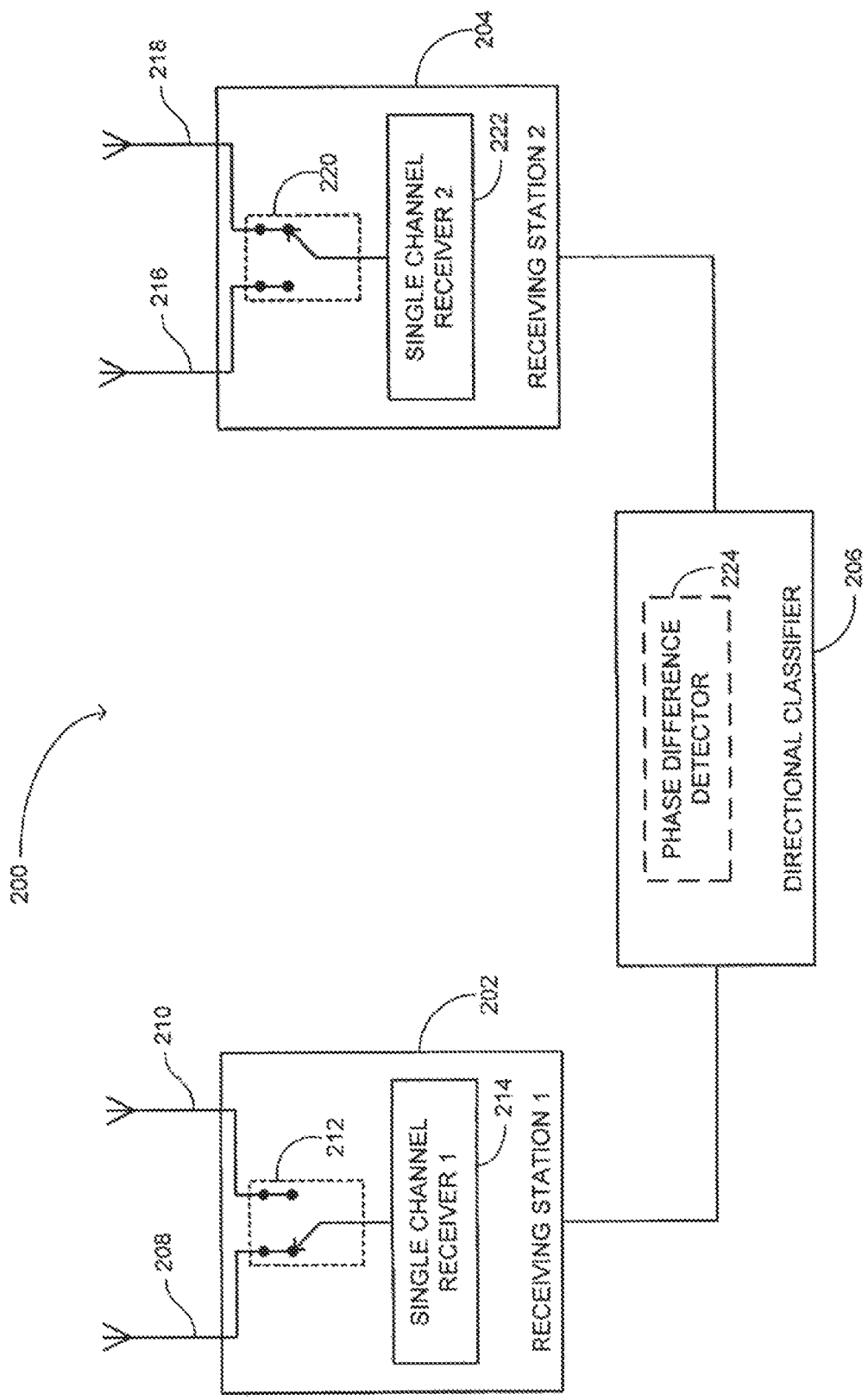
FIGS. 3A and 3B are a schematic illustrations of a system for directionally classifying received radio signals constructed and operative in accordance with a further embodiment of the disclosed technique.
Figure 3B:
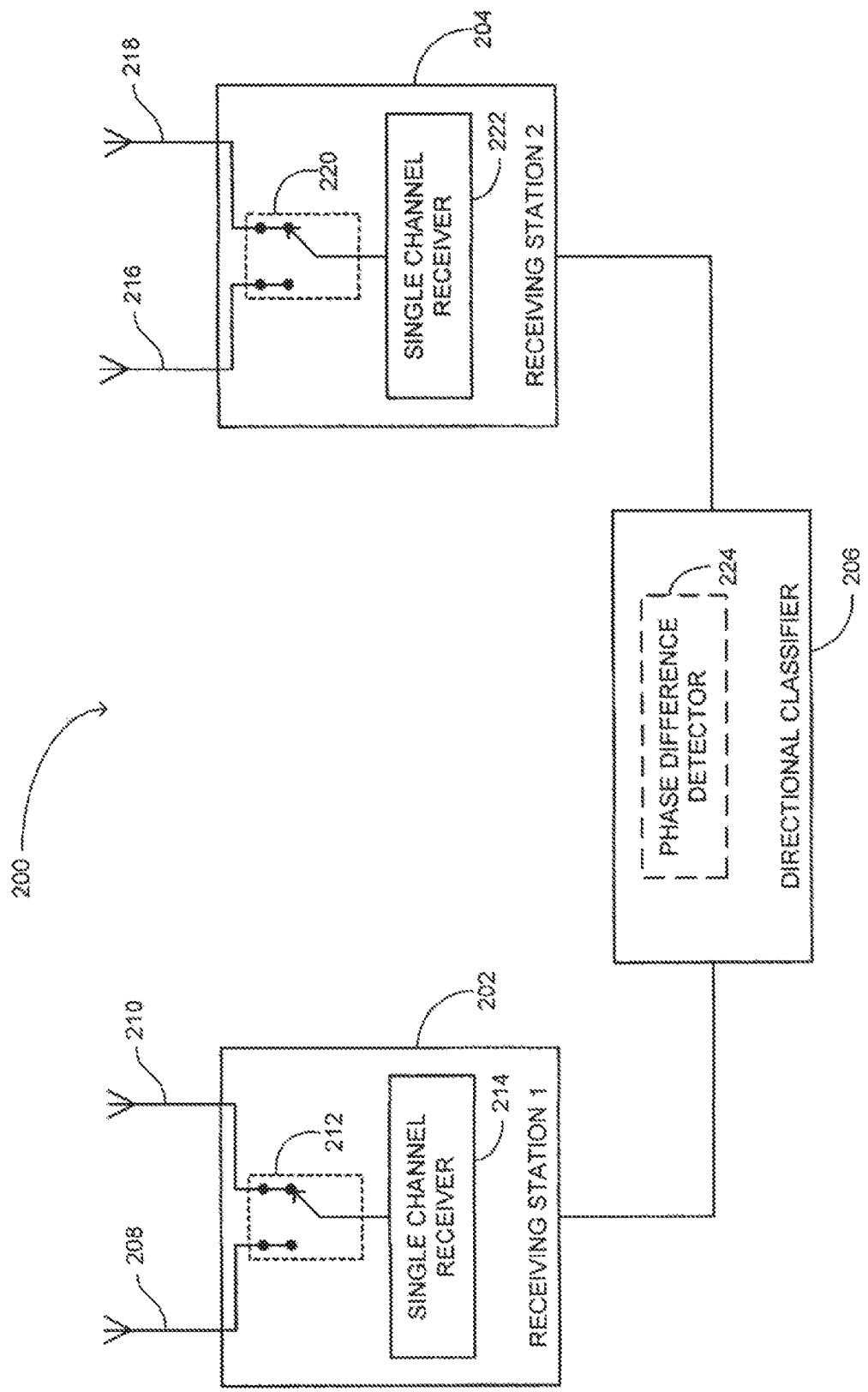
Figure 3C:
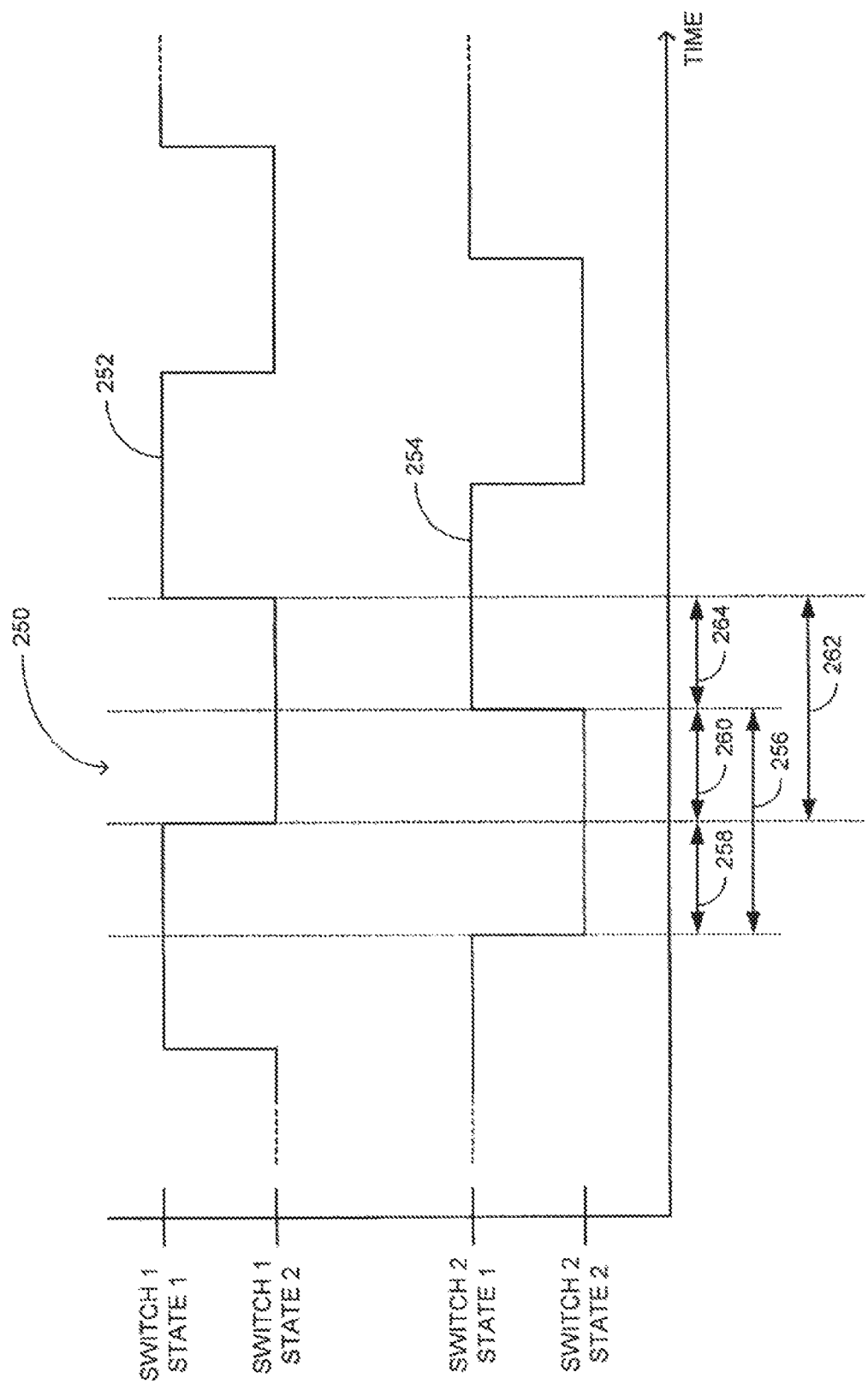
FIGS. 3C and 3D are exemplary timing diagrams for operating the system of FIGS. 3A and 3B.
Figure 3D:
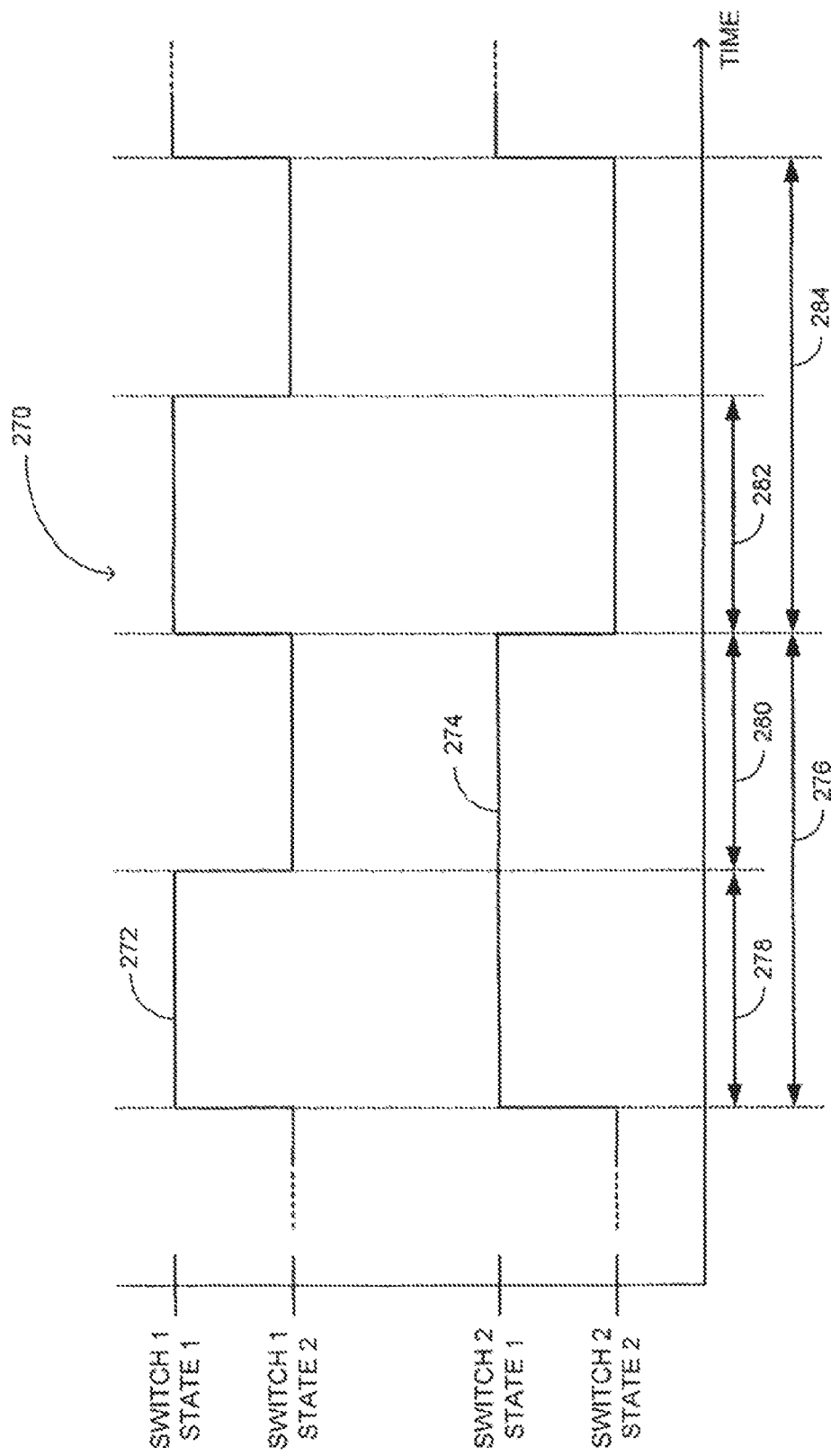

According to another embodiment of the disclosed technique, at least two receiving stations are employed, each including two antennas coupled with a respective single channel receiver via a respective switch. One of the antennas in one of the stations is used as the reference antenna for the other receiving station. Reference is now made to FIGS. 3A, 3B, 3C and 3D. FIGS. 3A and 3B are schematic illustrations of a system for directionally classifying received radio signals, generally referenced 200, constructed and operative in accordance with a further embodiment of the disclosed technique. FIGS. 3C and 3D are exemplary timing diagrams for operating system 200 as further explained below.

System 200 includes a first receiving station 202 a second receiving station 204 and a directional classifier 206. First receiving station 202 includes a first antenna 208, a second antenna 210, a first switch 212 and a first receiver 214. Second receiving station 204 includes a first other antenna 216, a second other antenna 218, a second switch 220 and a second receiver 222. Directional classifier 206 includes a phase difference detector 224. First switch 212 and second switch 220 are each similar to switch 112 (FIGS. 1A and 1B). The two input ports of first switch 212 are coupled with first antenna 208 and with second antenna 210 respectively and the output port of first switch 212 is coupled with first receiver 214. The two input ports of second switch 220 are coupled with first other antenna 216 and with second other antenna 218 respectively and the output port of second switch 220 is coupled with second receiver 222. Directional classifier 206 is coupled with first receiver 214 and with second receiver 222.

In this embodiment of the disclosed technique, one of the antennas in one of the stations serves as the reference antenna for the other station. For example, in FIGS. 3A and 3B, second other antenna 218 serves as the reference antenna for first receiving station 202. In FIG. 3A, switch 212 couples antenna 208 with first receiver 214 for at least a first measurement time-period and switch 220 couples second other antenna 218 with second receiver 222. In FIG. 3A each one of first antenna 208 and second other antenna 218 receives a respective radio signal originating from the same radio emitter, transforms the received radio signals to produce a respective electric received signal. First antenna 208 provides the electric received signal produced thereby to first receiver 214. Second other antenna 218 provides the electric received signal produced thereby to second receiver 222. Each one of first receiver 214 and second receiver 222 performs respective reception operations on each of the electric received signals (i.e., the electric received signal produced by first antenna 208 and the electric received signal produced by second reference antenna 218), similar to as described above in conjunction with FIGS. 1A and 1B and produce respective received signals. Each one of first receiver 214 and second receiver 222 provides the respective received signal produced thereby to phase difference detector 224. Similar to as described above in conjunction with FIGS. 1A and 1B, phase difference detector 224 measures the phase difference between the received signal from first antenna 208 and the received signal from second other antenna 218 during the first measurement time-period, to produce a first phase difference measurement.

With reference to FIG. 3B, switch 212 is depicted in a second state thereof. In this state, switch 212 couples second antenna 210 with first receiver 214 for at least a second measurement time-period. Each one of second antenna 210 and second other antenna 218 receives a respective radio signal originating from the radio emitter (i.e., the same radio emitter referred to in FIG. 1A). In other words, second other antenna 218 receive the radio signal during the time period in which first antenna 208 is coupled with first receiver 214 as well as during the time period in which second antenna 210 is coupled with first receiver 214. Second antenna 210 receives the radio signal, transforms the received radio signals to produce a respective electric received signal. First antenna 210 provides the electric received signal produced thereby to first receiver 214. Second other antenna 218 provides the electric received signal produced thereby to second receiver 222. Each one of first receiver 214 and second receiver 222 performs respective reception operations on each of the electric received signals to produce respective received signals and provides the respective received signals to phase difference detector 224. Similar to as described above in conjunction with FIG. 1A, phase difference detector 224 measures the phase difference between the received signal from second antenna 210 and the received signal from second other antenna 218 during the second measurement time period to produce a second phase difference measurement. Subtracting the second phase difference measurement from the first phase difference measurement, results in an estimate of the phase difference between the received signal form first antenna 208 and the received signal form second antenna 210 with the errors, due to the various error factors, alleviated.

FIG. 3C depicts a timing scheme, generally reference 250, for operating first switch 212 and second switch 220. Timing scheme 250 depicts two timing diagrams, timing diagram 252 and timing diagram 254. Timing diagram 252 depicts the transition times of first switch 212 between the two respective states thereof and timing diagram 254 depicts the transition times of second switch 220 between the two respective states thereof. Timing diagram 254 is out of phase with respect to timing diagram 252 and thus the operation of switch 220 with respect to the operation of switch 212 is also out or phase. For second other antenna 218 to function as a reference antenna for first receiving station 202, second switch 220 should couple second other antenna 218 with second receiver 222 during the time-period in which first switch 212 couples first antenna 208 with first receiver 214, as well as during the time-period in which first switch 212 couples second antenna 210 with first receiver 214. In FIG. 3C, time-period 256 represents the time-period during which second switch 220 couples second other antenna 218 with second receiver 222. During time-period 258 first switch 212 is at the first state thereof and couples first antenna 208 with first receiver 214. During time-period 260 first switch 212 is at the second state thereof and couples second antenna 210 with first receiver 214. Consequently, second other antenna 218 receives the radio signal during the time-period in which first antenna 208 is coupled with first receiver 214, as well as during the time-period in which second antenna 210 is coupled with first receiver 214. Thus, second other antenna 218 and can serve as a reference antenna for receiving station 202.

For second antenna 210 to function as a reference antenna for second receiving station 204, first switch 212 should couple antenna 210 with first receiver 214 during the time in which second switch 220 changes the state thereof. In FIG. 3C, time-period 262 represents the time-period during which first switch 212 couples second antenna 210 with first receiver 214. During time-period 262, second switch 220 changes the state thereof. During time-period 260, second switch 220 is at the second state thereof and during time-period 264 second switch 220 is at the first state thereof. Consequently, second antenna 210 receive the radio signal during the time period in which first other antenna 218 is coupled with second receiver 222 as well as during the time period in which second other antenna 220 is coupled with second receiver 222. Thus, second antenna 210 serves as a reference antenna for second receiving station 204.

FIG. 3D depicts a timing scheme, generally reference 270, for operating first switch 212 and second switch 220. Timing scheme 270 depicts two timing diagrams, timing diagram 272 and timing diagram 274. Timing diagram 272 depicts the transition times of first switch 212 between the two respective states thereof and timing diagram 274 depicts the transition times of second switch 220 between the two respective states thereof. Timing diagram 274 exhibits a different frequency with respect to timing diagram 272 and thus, switch 220 operates at a difference frequency then switch 212. In FIG. 3D, time-period 276 represents the time-period during which second switch 220 couples second other antenna 218 with second receiver 222. During time-period 276, first switch 212 changes the state thereof. During-time period 278 first switch 212 is at the first state thereof and couples first antenna 208 with first receiver 214. During time-period 280 first switch 212 is at the second state thereof and couples second antenna 210 with first receiver 214. Consequently, second reference antenna 218 receives during the time-period in which first antenna 208 is coupled with first receiver 214 as well as during the time-period in which second antenna 210 is coupled with first receiver 214. Thus, second other antenna 218 serves as a reference antenna for first receiving station 202.

In FIGS. 3C and 3D above, the operation (i.e., the switching scheme) of first switch 212 and second switch 220 is depicted as being either out of phase or exhibiting a difference in frequency one with respect to the other. However, it is noted that the operation of first switch 212 and second switch 220 may be both out of phase and exhibit a different frequency one with respect to the other. Also, first switch 212 and second switch 220 may exhibit different respective switch state intervals ratio. In general, the term 'switch state intervals ratio' refers to the ratio between any two time-periods during which a switch is at two respective states (i.e., including a null state when such exists). For example, in FIG. 3D, the ratio between time-period 278 and time-period 280 is a switch state intervals ratio respective of switch 212. The ratio between time-period 276 and 284 is a switch state interval ratio respective of switch 220. The switch state intervals ratio respective of switch 212 may be different from the switch state intervals ratio respective of switch 220. Further in general, a switch with N different states has $$\binom{N}{2}$$

(i.e., N choose 2) different switch state intervals ratios, each of which may be different form the other. For example, in case a switch has three states, there are three different switch state interval ratios. Define $A_1$ as the switch state interval ratio between the time-period during which a first switch is at the first state thereof and the time-period during which the switch is at the second state thereof. Define $B_1$ as the switch state interval ratio between the time-period during which the first switch is at the second state thereof and the time-period during which the switch is at the third state thereof. Define $C_1$ as the switch state interval ratio between the time-period during which the first switch is at the first state thereof and the time-period during which the switch is at the third state thereof. Similarly define $A_2$, $B_2$ and $C_2$ for a second switch. Following are two examples of the possible group of relationships between the different switch state intervals ratios. In the first example, $A_1 > B_1 = C_1$, $A_2 < B_2 = C_2$ and $A_1 > A_2$, $B_1 = B_2$ and $C_1 = C_2$. In the second example, $A_1 = B_1 > C_1$, $A_2 = B_2 > C_2$ and $A_1 = A_2$, $B_1 = B_2$ and $C_1 < C_2$. In other words, the switches respective of the different receiving stations are asynchronous one with respect to the other. Also, receiving stations 102 (FIG. 1A), 202 and 204 (FIGS. 3A and 3B), which included only two antennas are brought herein as an example only. Receiving stations, which include more than two antennas, may also be employed. Accordingly, the number of input ports of the switch shall at least equal the number of antennas employed. Furthermore, a reference antenna, such as reference antenna 116 (FIG. 1A), may serve more than one receiving station. Additionally more than two receiving stations, such as receiving stations 102 (FIG. 1A), 202 and 204 (FIG. 2A) may be employed. In such a case, each of the antennas in one receiving station may serve as a reference antenna to the other receiving stations, as long as the reference antenna receives the radio signal during the time-periods the switch couples each of the antennas in the other receiving station with the respective single channel receiver. Furthermore, the phase difference measurement between the received signal from the reference antenna and the received signal from the first antenna and between the received signal from the reference antenna and the received signal from the second antenna need not be during adjacent or subsequent.

It is also noted that when a plurality of receiving stations, such as receiving stations 102 (FIG. 1A), 202 and 204 (FIG. 2A) are employed, the switching schemes may also be random one with respect to the other, as long as the reference antenna in one receiving stations receive the radio signal during the time periods when each of the antennas in the outer receiving stations is coupled with the receiver. In other words, the switches of the respective receiving stations are asynchronous one with respect to the other. In addition, one antenna in a first receiving station may serve as a reference to the antennas in a second receiving station and one antenna in the second receiving station may serve as a reference for the antennas at a third receiving station etc.

Figure 4:
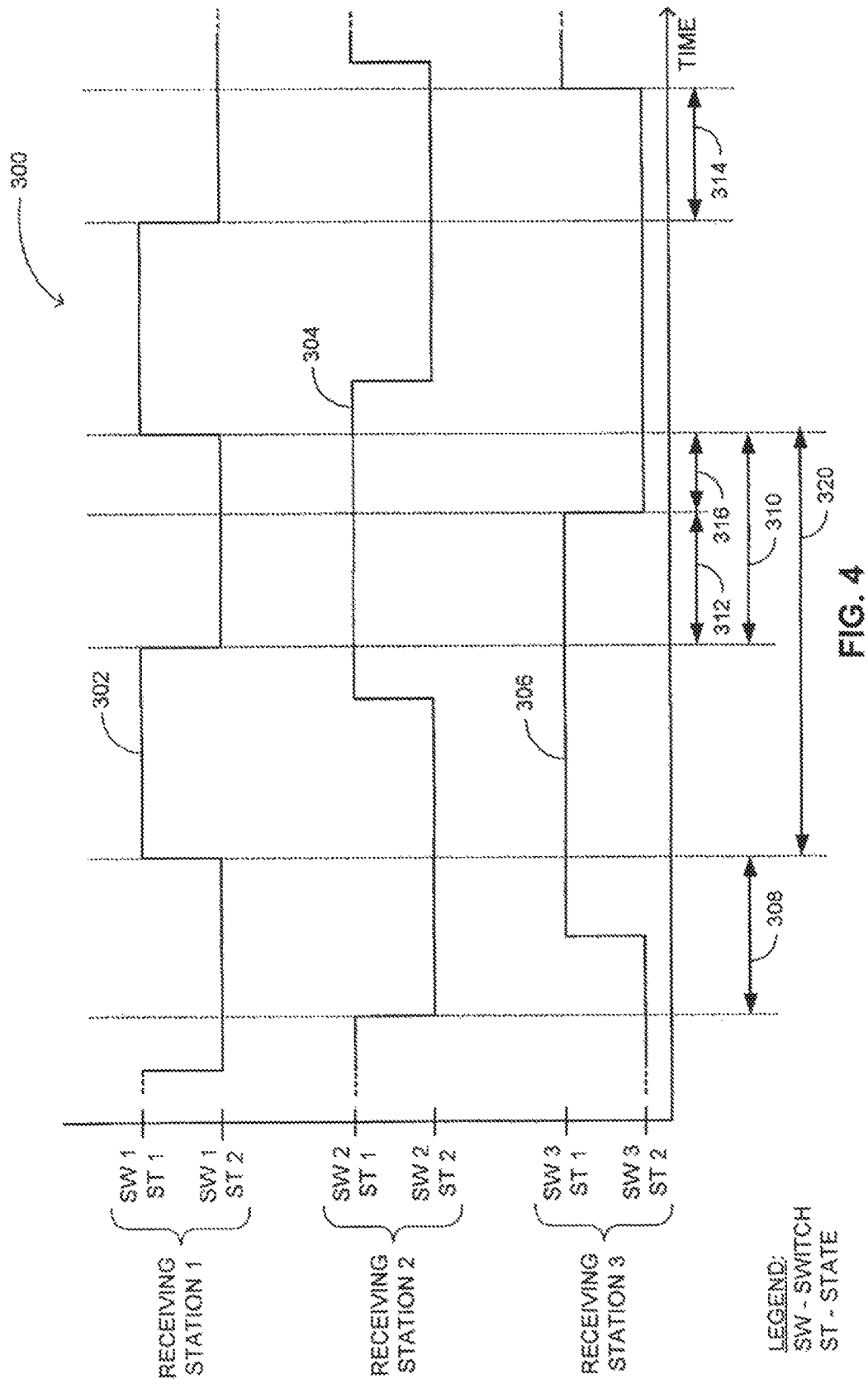
FIG. 4 is a schematic illustration of a timing scheme for operating a first switch, a second switch and a third switch located on a respective first receiving station, second receiving station and third receiving station in accordance with another embodiment of the disclosed technique.

Reference is now made to FIG. 4, which is a schematic illustration of a timing scheme, generally reference 300, for operating a first a first switch, second switch and a third switch located on a respective first receiving station, second receiving station and third receiving station in accordance with another embodiment of the disclosed technique. In FIG. 4, the term 'switch' is abbreviated 'SW' and the term 'state' is abbreviated 'ST'. In FIG. 4, timing scheme 300 depicts three timing diagrams, timing diagram 302, timing diagram 304 and timing diagram 306. Each one of timing diagrams 302, 304 and 306 represent the switching scheme of a respective switch locate at a respective receiving station. Timing diagram 302 relates to the switching times of the first switch located in the first receiving station. Timing diagram 304 relates to the switching times of the second switch located in a second receiver station. Timing diagram 306 relates to the switching times of the third switch located in a third receiving station. Timing diagram 302, timing diagram 304 and timing diagram 306 are random one with respect to the other with respect to frequency and phase. Timing diagram 302, timing diagram 304 and timing diagram 306 may further be random one with respect to the other with respect to the switch state intervals ratios thereof. In the example set forth in FIG. 4, an antenna in the first receiving station, connected to the receiver when the first switch is at the second state thereof, serves as the reference antenna for the other two receiver stations. This antenna is referred to as "the reference antenna". In the example set forth in FIG. 4, a phase difference detector measures the phase difference between the received signal produced by the reference antenna and the received signal produced by the first antenna of the second receiving station, during time-period 308. The phase difference detector further measures the phase difference between the received signal produced by the reference antenna and the received signal produced by the second antenna of the second receiving station during time-period 310. A directional classifier the then subtracts the two phase difference measurements to determine the phase difference between the signals received by the antennas of the second receiving station and to directionally classify the radio signal.

Similarly, the phase difference detector measures the phase difference between the received signal by the reference antenna and the received signal produced by the first antenna of the third receiving station during time-period 312. The phase difference detector further measures the phase difference between the received signal produced by the reference antenna and the received signal produced by the second antenna of the third receiving station during time-period 314. The directional classifier the then subtracts these phase difference measurements to determined the phase difference between the signals received by the antennas of the third receiving station. It is noted that, in the example set forth in FIG. 4, time-periods 308 and 310 are not adjacent to each other. In addition, time-periods 312 and 314 are also not adjacent to each other. Nevertheless, the measurements during these time-periods are sufficient to determine the phase difference between the antennas located on each of the receiving stations. However, the time-period between the end of time-period 308 and the start of time-period 310, as well as the time-period between the end of time-period 312 and the start of time-period 314 should be small enough to avoid distorting effects such as second order accelerations and vibrations.

According to another depicted in FIG. 4, the first antenna of the second receiving station may serve as a reference antenna for the third receiving station during time-period 310. The phase difference detector measures the phase difference between received signal from the first antenna of the second receiving station and the received signal from the first antenna of the third receiving station during time-period 312. The phase difference detector measures the phase difference between received signal from the first antenna of the second receiving station and the received signal from the second antenna of the third receiving station during time-period 316.

Figure 5:
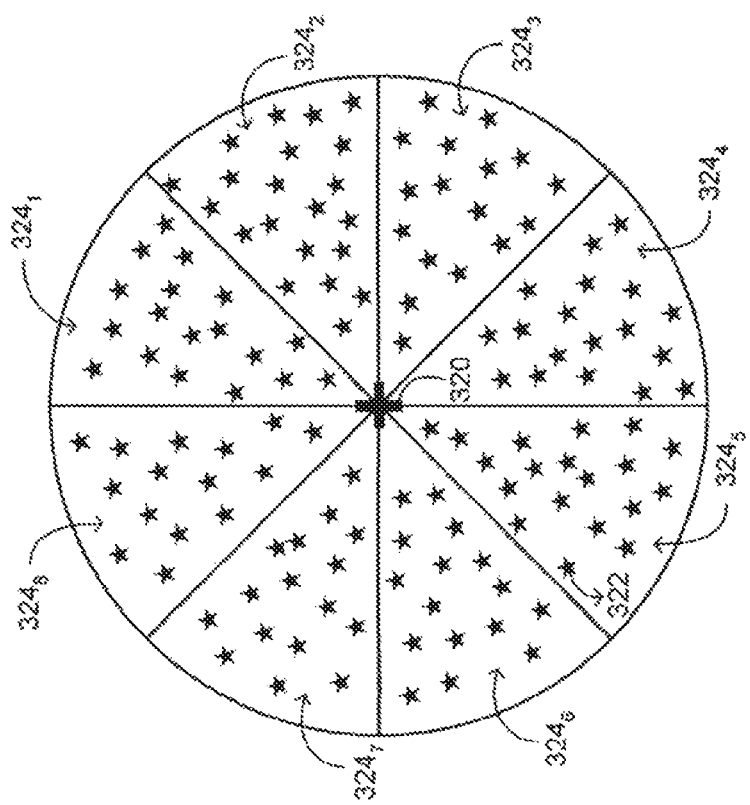
FIG. 5 is a schematic illustration of a receiving station and the vicinity thereof saturated with radio emitters in accordance with a further embodiment of the disclosed technique.

As mentioned above, the DOA of received radio signals is determined and may be employed to classify the received radio signals. Reference is now made to FIG. 5, which is a schematic illustration of a receiving station, generally referenced 320, and the vicinity thereof saturated with radio emitters in accordance with a further embodiment of the disclosed technique. Receiving station 320 is similar to either one of receiving stations 102 (FIGS. 1A and 1B) and receiving station 202 and 204 (FIGS. 2A and 2B) described above. The vicinity of receiving station 320 includes a plurality of radio emitters (e.g., radars transmitters, voice or data communication transmitters and the like) such as radio emitter 322. Receiving station 320 employs the disclosed technique described above in conjunction with Figure FIGS. 1A, 1B, 2A, 2B, 3A, 3B, 3C 3D and 4 to directionally classify the radio emitters (i.e., classify the emitters according to the directions thereof from receiving station thereof), for example by determining the angular section from which the radio signal was received. In FIG. 3, the vicinity of receiving station 320 is partitioned into eight angular sections $324_1$, $324_2$, $324_3$, $324_4$, $324_5$, $324_6$, $324_7$ and $324_8$. Receiving station 320 may select the radio emitters located in one or more of these angular sections for further processing. It is noted that for the purpose of directionally classifying the received radio signals, the DOA of these radio signals need not necessarily be determined. Rather, for each frequency of interest, it is sufficient to determine the phase difference between the received signals from the two antennas of a receiving station and classify the received radio signals accordingly.

Figure 6:
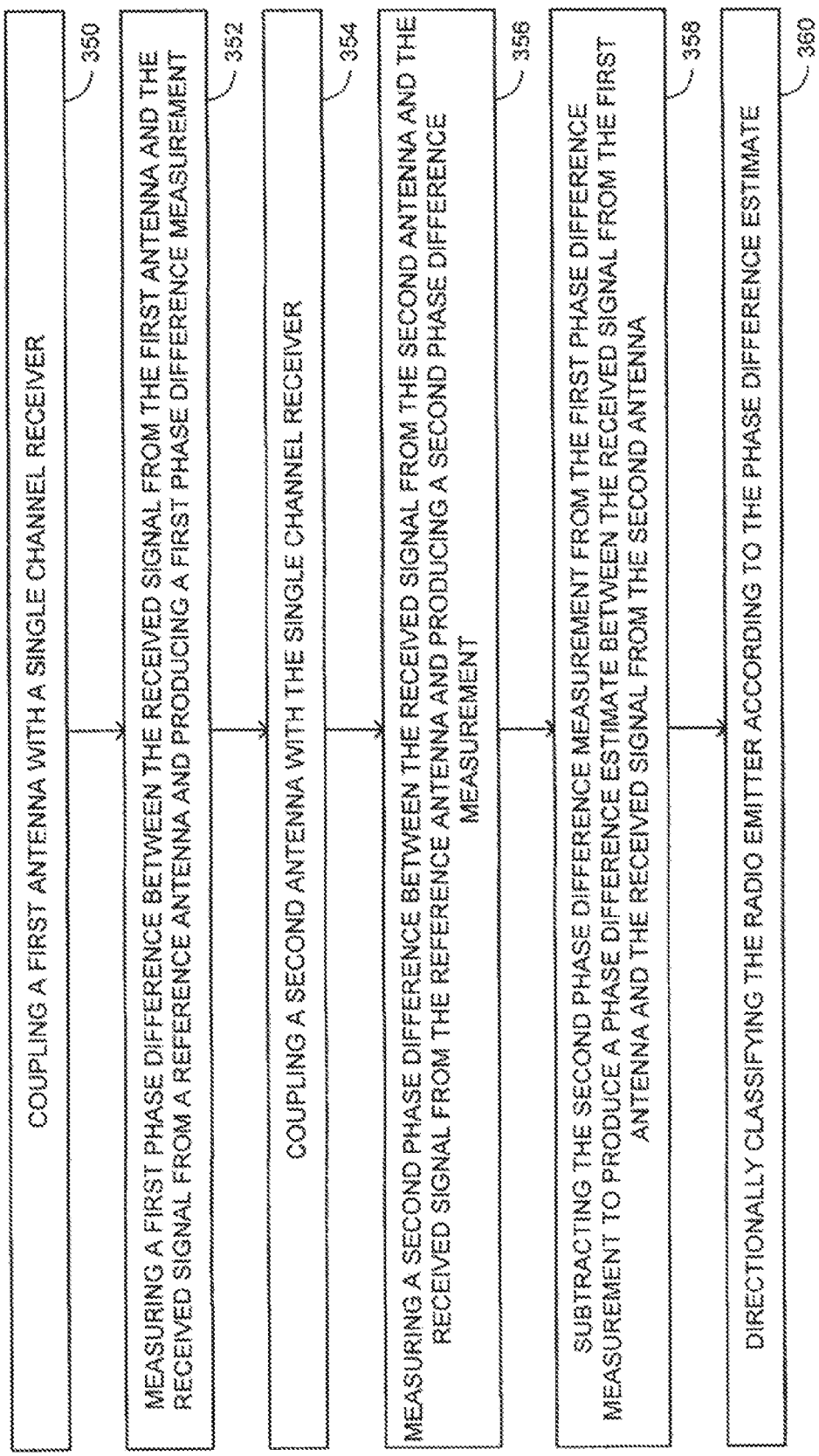
FIG. 6 is a schematic illustration of a method for directionally classifying received radio signals in accordance with another embodiment of the disclosed technique.

Reference is now made to FIG. 6, which is a schematic illustration of a method for directionally classifying of received radio signals in accordance with another embodiment of the disclosed technique. In procedure 350, a first antenna is coupled with a single channel receiver. With reference to FIGS. 1A and 1B, switch 112 couples first antenna 108 with receiver 114. With reference to FIGS. 3A and 3B, switch 212 couples first antenna 208 with first receiver 214.

In procedure 352, a first phase difference between the received signal from the first antenna and the received signal from a reference antenna is measured, producing a first phase difference measurement. This first phase difference measurement may include errors caused by various error factors. These error factors are, for example, the drift between the clocks of the two different receivers or by the modulation of the received signal. The error factors may further be the phase ambiguity when the distance between the first antenna and the reference antenna is larger than half the wavelength of the radio signal or due to relative motion between the two receiving stations, which may introduce Doppler shifts. With reference to FIGS. 1A and 1B, phase difference detector 120 measures the phase difference between the signal received by first antenna 108 and reference antenna 116. With reference to FIGS. 3A and 3B, phase difference detector 224 measures the phase difference between the signal received by first antenna 208 and one of first reference antenna 216 or second reference antenna 218 which currently serves as the reference antenna (i.e., coupled via switch 220 to receiver 224.

In procedure 354, a second antenna is coupled with the single channel receiver. With reference to FIGS. 1A and 1B, switch 112 couples second antenna 110 with receiver 114. With reference to FIGS. 3A and 3B, switch 212 couples second antenna 210 with first receiver 214.

In procedure 356 a second phase difference between the received signal from the second antenna and the received signal from the reference antenna is measured, producing a second phase difference measurement. This second phase difference measurement also includes errors caused by the error factors mentioned above. With reference to FIGS. 1A and 1B, phase difference detector 120 measures the phase difference between the signal received by second antenna 108 and reference antenna 116. With reference to FIGS. 3A and 3B, phase difference detector 224 measures the phase difference between the signal received by second antenna 210 and one of first reference antenna 216 or second reference antenna 218 which currently serves as the reference antenna (i.e., coupled via switch 220 to receiver 224.

In procedure 358, the second phase difference measurement is subtracted from the first phase difference measurement to produce a phase difference estimate between the phase difference of the received signal from the first antenna and the received signal from the second antenna. Since the error caused by the error factors is substantially the same for the first phase difference measurement and for the second phase difference measurement, the errors from the phase difference estimate are alleviated when these two phase difference measurements are subtracted. With reference to FIGS. 1A and 1B, directional classifier 106 subtracts the second phase difference measurement from the first phase difference measurement. With reference to FIGS. 3A and 3B, directional classifier 206 subtracts the second phase difference measurement from the first phase difference measurement.

In procedure 360, the radio emitter is directionally classified according to the phase difference estimate. This classification may be, for example, determining the angular section from which the radio signal was received. As mentioned above, for directionally classifying the received radio signals, the DOA of these radio signals need not necessarily be determined. Rather, for each frequency of interest, it is sufficient to determine the phase difference between the signals received by the two antennas of a receiving station and classify the received radio signals accordingly. Directional classifying a radio signal may also include determining the DOA of the radio signal according to the phase difference between the signals received by the two antennas of a receiving station. With reference to FIGS. 3A and 3B, directional classifier 206 directionally classifies the radio emitter.

It will be appreciated by persons skilled in the art that the disclosed technique is not limited to what has been particularly shown and described hereinabove. Rather the scope of the disclosed technique is defined only by the claims, which follow.

The invention claimed is:

1. A system for directionally classifying of a radio signal originating from an emitter, said system comprising:
   a receiving station including:
      a switch, including at least two input ports and at least one output port, said switch alternately coupling each of said at least two input ports with said output port;
      an antenna, coupled with a respective one of said at least two input ports, receiving at least a radio signal originating from said emitter and producing a first electric received signal;
      at least a second antenna, coupled with a respective another one of said at least two input ports, receiving at least said radio signal originating from said emitter and producing a second electric received signal; and
      a single channel receiver, coupled with said output port of said switch, performing reception operations on said first electric received signal and on said second electric received signal and producing a first and a second received signals respectively;

at least one other receiving station including:
  at least a first other antenna, receiving respective said radio signal originating from said emitter and producing another electric received signal; and
  another receiver, coupled with said at least first other antenna, performing reception operations on said another electric signal produced by said first other antenna and producing another received signal, said another receiver being asynchronous with said single channel receiver; and
a directional classifier, including a phase difference detector, coupled with said single channel receiver and with said another receiver, said phase difference detector measuring a plurality of first phase differences between said first received signal and said another received signal when said switch couples said antenna with said single channel receiver, producing a first phase difference measurement curve, said phase difference detector further measuring a plurality of second phase differences between said second received signal and said another received signal when said switch couples said second antenna with said single channel receiver, producing a second phase difference measurement curve, said directional classifier subtracting said second phase difference measurement curve from said first phase difference measurement curve producing a phase difference estimate between said first electric received signal and said second electric received signal, thereby alleviating errors in the phase difference measurements, said errors being caused by error factors, said error factors including at least one of clock drift, phase ambiguity, and Doppler shift.

2. The system according to claim 1, wherein said directional classifier further classifies said radio signal according said phase difference estimate.

3. The system according to claim 2, wherein said directional classifier determines the direction of arrival of said radio signal according to said phase difference estimate and classifies said radio signal according to said direction of arrival.

4. The system according to claim 1, wherein said at least one other receiving station further includes:
  another switch, including at least two other input ports and at least one other output port, said switch alternately coupling each of said at least two other input ports with said other output port, said at least first other antenna is coupled with a respective one of said at least two other input ports; and
  at least a second other antenna, coupled with the other one of said at least two other input ports, receiving at least said radio signal originating from said emitter and producing a second other electric received signal,
  wherein said another receiver is a single channel receiver coupled with the output port of said other switch and performs reception operations on said another electric received signal and on said second other electric received signal.

5. The system according to claim 4, wherein said phase difference detector measures another plurality of first phase differences between one of said first received signal and said second received signal, and said another received signal, when said another switch couples said at least another antenna with said another receiver, producing another first phase difference measurement curve,
  said phase difference detector further measuring another plurality of second phase differences between one of said first received signal and said second received signal, and said second other received signal when said other switch couples said at least second other antenna with said another receiver, producing another second phase difference measurement curve, said directional classifier subtracts said another second phase difference measurement curve from said another first phase difference measurement curve producing another phase difference estimate.

6. The system according to claim 5, wherein said directional classifier further classifies each received signal according to said another phase difference estimate.

7. The system according to claim 5, wherein said directional classifier determines another direction of arrival of said radio signal according to said another phase difference estimate and classifies said radio signal according to said another direction of arrival.

8. The system according to claim 4, wherein said switch couples each of said at least two input ports with said output port according to a switching scheme, and
  wherein said another switch couples each of said at least two other input ports with said other output port according to another switching scheme.

9. The system according to claim 8, wherein said switching scheme and said another switching scheme are different one with respect to the other with respect to at least one of the frequency of said switching scheme, the phase of said switching scheme and the switch state intervals ratios.

10. The system according to claim 1, wherein each of said single channel receiver and said another receiver are one of a superheterodyne receiver and a software radio receiver.

11. The system according to claim 10, wherein said reception operations is at least one of:
  down conversion;
  filtering;
  sampling;
  demodulation; and
  equalization.

12. A method for directionally classifying of a radio signal originating from an emitter, said method comprising the procedures of:
  coupling a first antenna with a single channel receiver;
  measuring a plurality of first phase differences between a received signal from said first antenna and a received signal from a reference antenna and producing a first phase difference measurement curve;
  coupling a second antenna with said single channel receiver;
  measuring a plurality of second phase differences between a received signal from said second antenna and a received signal from said reference antenna and producing a second phase difference measurement curve;
  subtracting said second phase difference measurement curve from said first phase difference measurement curve to produce a phase difference estimate between said received signal from said first antenna and said received signal from said second antenna thereby alleviating errors in the phase difference measurements, said errors being caused by error factors, said error factors including at least one of clock drift, phase ambiguity, and Doppler shifts; and
  directionally classifying said emitter according to said phase difference estimate.

* * * * *